(12) United States Patent
Cimino et al.

(10) Patent No.: US 10,104,564 B1
(45) Date of Patent: Oct. 16, 2018

(54) METHODS AND APPARATUS TO DETERMINE MOBILE DEVICE APPLICATION USAGE IN VEHICLES INCLUDING MEDIA APPLICATIONS

(71) Applicant: The Nielsen Company (US), LLC, New York, NY (US)

(72) Inventors: Susan Cimino, Odessa, FL (US); Stanley Woodruff, Palm Harbor, FL (US); Achilleas Papakostas, Dallas, TX (US); John T. Livoti, Clearwater, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 15/487,198

(22) Filed: Apr. 13, 2017

(51) Int. Cl.
| | |
|---|---|
| *H04B 17/00* | (2015.01) |
| *H04W 24/08* | (2009.01) |
| *H04W 8/26* | (2009.01) |
| *H04W 4/04* | (2009.01) |
| *H04W 8/18* | (2009.01) |

(52) U.S. Cl.
CPC ........... *H04W 24/08* (2013.01); *H04W 4/046* (2013.01); *H04W 8/18* (2013.01); *H04W 8/26* (2013.01)

(58) Field of Classification Search
CPC ....... H04W 24/08; H04W 4/046; H04W 8/18; H04W 8/26
USPC ............................................ 455/67.11, 575.9
See application file for complete search history.

(56) References Cited

U.S. PATENT DOCUMENTS

| | | | | |
|---|---|---|---|---|
| 7,420,464 B2* | 9/2008 | Fitzgerald | .............. | G06Q 30/00 340/539.13 |
| 7,876,205 B2 | 1/2011 | Catten et al. | | |
| 8,065,508 B2 | 11/2011 | Rubin et al. | | |
| 8,452,273 B1* | 5/2013 | Khomenko | ............ | G01C 21/16 455/418 |
| 8,549,552 B2* | 10/2013 | Ramaswamy | ......... | H04R 29/00 381/56 |
| 8,594,617 B2* | 11/2013 | Papakostas | ........... | H04L 67/303 370/338 |
| 8,660,478 B2 | 2/2014 | Kostepen | | |
| 8,914,012 B2* | 12/2014 | Crosbie | ................. | H04W 4/046 455/418 |
| 9,363,647 B2* | 6/2016 | Kim | ...................... | H04W 4/046 |
| 2010/0178872 A1* | 7/2010 | Alrabady | ................ | H04W 4/02 455/41.3 |
| 2011/0115618 A1* | 5/2011 | Catten | .................... | H04K 3/415 340/439 |

(Continued)

OTHER PUBLICATIONS

Nham et al, "Predicting Mode of Transport from iPhone Accelerometer Data," retrieve from https://pdfs.semanticscholar.org/111a/8a8faf04e754dcef1f0d4701a2d6af36ce8b.pdf, Apr. 2012, 5 pages.

*Primary Examiner* — April G Gonzales
(74) *Attorney, Agent, or Firm* — Hanley, Flight & Zimmerman, LLC

(57) ABSTRACT

Methods and apparatus are disclosed to determine the mobile device usage within vehicles having media application are described herein. An example method includes classifying an SSID detected by a mobile device as a vehicle SSID, determining application usage of a mobile device and a vehicle media device, and determining a ratio of mobile device application usage to vehicle media device application usage.

14 Claims, 8 Drawing Sheets

(56) References Cited

U.S. PATENT DOCUMENTS

| | | | |
|---|---|---|---|
| 2012/0035881 A1* | 2/2012 | Rubin | H04M 1/72563 702/141 |
| 2012/0040650 A1* | 2/2012 | Rosen | H04M 3/2218 455/414.1 |
| 2012/0096249 A1* | 4/2012 | Rubin | H04M 1/72563 713/1 |
| 2012/0129544 A1* | 5/2012 | Hodis | G01S 19/34 455/456.1 |
| 2013/0232324 A1* | 9/2013 | Rubin | H04M 1/72563 713/1 |
| 2013/0245986 A1* | 9/2013 | Grokop | H04M 1/72569 702/141 |
| 2014/0107869 A1* | 4/2014 | Kostepen | H04N 7/20 701/2 |
| 2014/0337253 A1* | 11/2014 | Berezin | G06Q 50/06 705/412 |
| 2014/0354227 A1* | 12/2014 | Tyagi | B60L 11/1844 320/109 |
| 2014/0354228 A1* | 12/2014 | Williams | B60L 11/1844 320/109 |
| 2014/0358749 A1* | 12/2014 | Williams | G06Q 30/04 705/34 |
| 2015/0057926 A1* | 2/2015 | Gupta | G01C 21/165 701/500 |
| 2015/0066823 A1* | 3/2015 | Rubin | H04W 1/72563 706/12 |
| 2015/0099495 A1* | 4/2015 | Crosbie | B60W 50/14 455/414.3 |
| 2015/0151648 A1* | 6/2015 | Przybylski | B60L 11/1861 701/2 |
| 2015/0154711 A1* | 6/2015 | Christopulos | G06Q 40/08 705/7.29 |
| 2015/0262198 A1* | 9/2015 | Bai | B60K 35/00 705/7.31 |
| 2015/0262201 A1* | 9/2015 | Rao | G06Q 30/0201 705/7.29 |
| 2015/0356795 A1* | 12/2015 | Warren | H04W 4/80 701/31.5 |
| 2015/0382286 A1* | 12/2015 | Daoud | H04W 48/16 455/434 |
| 2016/0025859 A1* | 1/2016 | Basnayake | G04R 20/06 342/357.62 |
| 2016/0323052 A1* | 11/2016 | Kostepen | H04N 7/20 |
| 2017/0034810 A1* | 2/2017 | Pal | H04W 84/04 |
| 2017/0353555 A1* | 12/2017 | Lauer | G06F 21/36 |

* cited by examiner

172

| | MOBILE DEVICE IDENTIFIER | DATE AND TIME | SSID DETECTED | SSID DETECTION DURATION |
|---|---|---|---|---|
| 1 | MD_102692 | 2016/11/21 10:20 A | AUTO_PHONE | 23 MINUTES |
| 2 | MD_102692 | 2016/11/21 10:26 A | VEHICLE_AP | 5 MINUTES |
| 3 | MD_102692 | 2016/11/21 11:16 A | GUEST_AP | 2 MINUTES |
| ... | ... | ... | ... | ... |
| 11 | MD_102692 | 2016/11/21 12:13 P | HOME_AP | 143 MINUTES |
| ... | ... | ... | ... | ... |

| | 402 MOBILE DEVICE IDENTIFIER | 404 APPLICATION | 406 APPLICATION START TIME | 408 APPLICATION DURATION |
|---|---|---|---|---|
| 1 | MD_102692 | MUSIC | 2016/11/11 6:19 P | 20 MINUTES |
| 2 | MD_102692 | SOCIAL MEDIA | 2016/11/11 6:19 P | 12 MINUTES |
| 3 | MD_102692 | GAME | 2016/11/11 6:31 P | 8 MINUTES |
| ... | ... | ... | ... | ... |
| 11 | MD_102692 | MUSIC | 2016/11/21 10:04 A | 17 MINUTES |
| ... | ... | ... | ... | ... |

| | VEHICLE SSID IDENTIFIER | APPLICATION | APPLICATION START TIME | APPLICATION DURATION |
|---|---|---|---|---|
| 1 | AUTO_PHONE | MUSIC | 2016/11/21 10:20 A | 17 MINUTES |
| 2 | AUTO_PHONE | MAPS | 2016/11/21 10:22 A | 10 MINUTES |
| 3 | AUTO_PHONE | PHONE | 2016/11/21 10:31 A | 3 MINUTES |
| ... | ... | ... | ... | ... |
| 11 | AUTO_PHONE | MUSIC | 2016/12/1 4:26 P | 27 MINUTES |
| ... | ... | ... | ... | ... |

FIG. 5

METHODS AND APPARATUS TO DETERMINE MOBILE DEVICE APPLICATION USAGE IN VEHICLES INCLUDING MEDIA APPLICATIONS

FIELD OF THE DISCLOSURE

This disclosure relates generally to determining mobile device usage in vehicles, and, more particularly, to methods and apparatus to determine mobile device application usage in vehicles including media applications.

BACKGROUND

In recent years, car manufacturers, working closely with various software application developers, have been improving the technology within vehicles. In-vehicle infotainment systems may have various music playing software or GPS software programmed into the vehicle itself.

Applications being developed for the software in vehicles are also present on many different mobile devices, such as smart phones and tablets. Some application users have a preference for the mobile phone application, some application users have a preference for the in-vehicle infotainment application, and some users may use both.

BRIEF DESCRIPTION OF THE DRAWINGS

FIG. 3 is an example Service Set Identifier (SSID) detection log.

FIG. 4 is an example mobile device application usage log.

FIG. 5 is an example vehicle infotainment application usage log.

Figure 1:
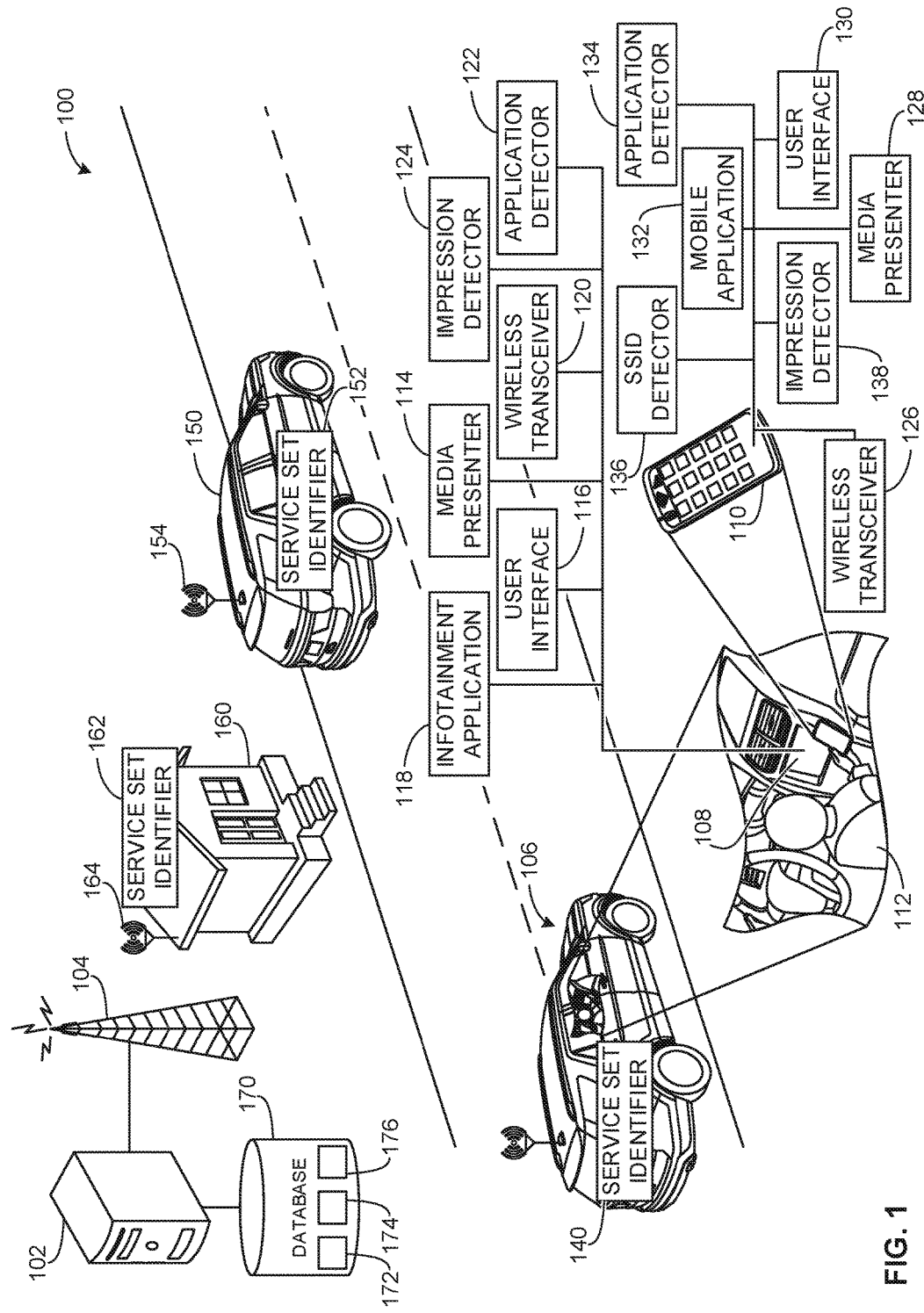
FIG. 1 is an example wireless application monitoring system.

The figures are not to scale.

DETAILED DESCRIPTION

In recent years, car manufacturers have increased the technological capabilities of their vehicles. Vehicles now have the computing power to operate like any other mobile device. Many such vehicles have similar applications and functionalities as mobile smartphones. These vehicles having wireless communication capabilities are otherwise known as connected cars.

Among other functions, such as facilitating telephone calls and providing directions, these vehicles also often contain audio and visual media presenting applications, such as a music streaming service. In the past, a user wishing to listen to music in the car would need to have a compact disc (CD) or connect their mobile device to the Bluetooth system in the car. Now, the connected car system can stream music from the internet without utilizing the network connectivity of a mobile device.

In upgrading the vehicles to include these new media presenting applications, car manufacturers work alongside the producers of media presenting software. The same application created for a vehicle infotainment system is likely available for use on any general laptop, tablet, or smartphone. Having duplicate applications, users now have the option to use the same application on one of several devices while driving.

Producers of media presenting software, such as music streaming services that have applications for both mobile devices and in-vehicle infotainment systems don't have the means to see, on a market-wide scale, how often users of their software utilize a given in-vehicle infotainment application (e.g., in-vehicle media device application) versus the corresponding mobile device application when in a connected car.

Differentiating the usage patterns of users utilizing these applications could help producers of media presenting software best allocate their resources into the platforms that are most used.

Audience measurement entities, such as The Nielsen Company LLC, use a variety of means to gather information from panelists who provide user information helpful in determining the habits of the general population. Audience measurement entities can use many different techniques to detect mobile device application usage or in-vehicle infotainment application usage, however there is still the challenge of determining which device is used when both are available to the end user.

In accordance with the present disclosure, audience measurement entities can now classify certain times when the mobile device was in a connected car either by computer algorithm or human inspection, ascertain what mobile device applications were used while the mobile device was in a connected car, and ascertain what vehicle infotainment applications were used while a mobile device was in the car.

Many vehicles on the road, either by manufacturer design or aftermarket device alterations, have and transmit an SSID. The SSID is an identifier that can be used by wireless devices or people to easily recognize possible wireless connections that are detected by a device, such as a mobile device, a laptop, etc. SSIDs are also used by wireless networks found in houses and businesses.

A mobile device user who owns a connected car, will often connect their mobile device automatically to the connected car by recognizing the vehicle SSID. The mobile device can automatically detect and connect to the vehicle wireless connection. It is through this connection that the user can utilize the mobile device to stream music or make phone calls through the in-vehicle infotainment system.

While a mobile device is connected to a connected car's infotainment system, the mobile device is still able to detect the SSIDs of vehicles, stores, houses, and businesses that are broadcasting their SSIDs. In many instances, the mobile device is not connecting to the devices broadcasting their SSIDs, but identifying the presence of these SSIDs.

Audience measurement entities can leverage the detection of a plurality of networks (e.g., SSIDs) while detecting or being connected to a single wireless network as a means of identifying the presence of a mobile device in a connected car. For example, a mobile phone detecting one SSID while a plurality of other SSIDs come and go out of range is indicative of a mobile device being in a connected car.

Audience measurement entities can also receive information from panelists about mobile device application usage. The information can include what application was used, when the application was used, for how long the application was used, and any SSIDs the phone detected or was connected to during the use of the application. Audience measurement entities can also receive information from panelists about in-vehicle infotainment application usage via in-vehicle media device impression data. The information can include what application was used, when the application was used, for how long the application was used, and the SSID of the vehicle.

Using the information provided, an audience measurement entity can reasonably determine when a mobile device was in a connected car. This information can be examined against mobile device application usage data to determine if a mobile device application was used while the mobile device was in a connected car. Additionally the information received concerning mobile device application usage and in-vehicle infotainment application usage can be used to determine if a mobile device was in a car while an in-vehicle infotainment application was used.

This application usage information, divided into time segments (e.g. weekdays and weekends, mornings and evenings, rush hour or not etc.) or taken as an overall quantity can be provided to producers of media presenting software and car manufacturers for quantifying a user usage pattern of mobile device application usage and in-vehicle infotainment application usage. Knowing who uses which software, when they use or don't use the software, and how often they use or don't use the software can greatly improve the ability of producers of media presenting software and car manufacturers to meet the needs of their customers.

FIG. 1 is an illustrated example of an application monitoring system 100. The application monitoring system 100 of FIG. 1 is adapted for monitoring a usage of in-vehicle infotainment applications and mobile device applications. An example audience measurement entity 102 receives, via a wireless network 104 (e.g., network communications), application usage data associated with a vehicle 106. The example vehicle 106 includes a vehicle infotainment system 108 (e.g., in-vehicle media device), a mobile device 110, and a user 112.

The example vehicle 106 of the illustrated example can be a connected car, manufactured to include the vehicle infotainment system 108, or a vehicle with aftermarket devices including the vehicle infotainment system 108. The example vehicle infotainment system 108 of the illustrated example includes a media presenter 114, a user interface 116, an infotainment application 118, a wireless transceiver 120, an application detector 122, and an impression detector 124.

In the example of FIG. 1, the vehicle 106 interacts with the mobile device 110 via the wireless transceiver 120 on the vehicle 106 and a wireless transceiver 126 on the mobile device 110. The example mobile device 110 could be implemented using a smartphone, tablet, laptop or similar portable computing device. The example mobile device 110 includes the wireless transceiver 126, a media presenter 128, a user interface 130, a mobile application 132, an application detector 134, an SSID detector 136, and an impression detector 138.

The example mobile device 110, through the wireless transceiver 126, interacts with the vehicle 106 by first detecting an SSID 140 transmitted by the wireless transceiver 120. The mobile device 110 can optionally connect with the vehicle 106 after it has detected the SSID 140. Detection of the SSID 140 by the wireless transceiver 126 activates the SSID detector 136, which instructs the impression detector 138 to transmit an SSID impression (e.g., a message, packet, etc.) to the example audience measurement entity 102. In some examples, the transmitted SSID impression includes user and/or device identification information. In some examples, the impression detector transmits each impression individually upon the detection of an impression while in other examples the impression detector stores impressions and transmits multiple impressions in batches, either at a regular time interval (e.g., daily, weekly) or upon detecting a number of impressions (e.g., 10 impressions, 50 impressions, 100 impressions etc.).

In the illustrated example, as the vehicle 106 moves about the example application monitoring system 100, the vehicle 106 passes within wireless range of an example vehicle 150 that transmits an SSID 152 via a wireless transmitter 154. An example building 160, which could be a house, store, or other facility containing a wireless network, transmits an SSID 162, that may be detected by the vehicle 106, via a wireless transmitter 164. The vehicle 106 may encounter any number of different example vehicles 150 or different example buildings 160 as it moves through the application monitoring system 100.

To gather SSID impressions, the mobile device 110 detects SSID 152 of the example vehicle 150 and SSID 162 of the example building 160. Detection of either SSID 152 or 162 activates the example SSID detector 136, which instructs the impression detector 138 to transmit an SSID impression to the example audience measurement entity 102. In some examples, the impression detector 138 transmits each impression individually upon the detection of an impression while in other examples the impression detector 138 stores impressions and transmits multiple impressions in batches, either at a regular time interval (e.g., daily, weekly) or upon detecting a number of impressions (e.g., 10 impressions, 50 impressions, 100 impressions etc.).

The example user 112, being a passenger or driver of the vehicle 106, can control the example vehicle infotainment system 108 (e.g. in-vehicle media device) and the example mobile device 110 via their respective user interfaces 116 and 130. User 112 interaction with the vehicle infotainment system 108 or the mobile device 110 includes, for example, an instance of usage of the example infotainment application 118 or the example mobile application 132 respectively.

In some examples, activation of the infotainment application 118 (e.g., in-vehicle media device application usage) or the mobile application 132 will cause the respective media presenter 114 or 128 to access audio, visual, or both audio and visual media. The media to be presented can be either stored in the respective device or streamed via a wireless network.

In the illustrated example, activation (e.g., instance of usage) of infotainment application 118 or mobile application 132 activates the respective example application detector 122 or 134. In such an example, the application detector 122 or 134 instructs the example impression detector 124 or 138 to transmit an application impression or a batch of application impressions to the example audience measurement entity 102. In some examples, the application impression includes user and/or device identification information.

Additionally, the example mobile device 110 in wireless communication with the vehicle 106 can present via the example media presenter 114, audio, visual, or both audio and visual media from the example mobile application 132. The presentation of media at the media presenter 114 of media from the mobile application 132 activates the example impression detector 138 which transmits a mobile application impression to the audience measurement entity 102.

In the illustrated example, impressions received by the audience measurement entity 102 from impression detectors 124 and 138 are stored in an example database 170. The example database 170 may additionally include an SSID detection impression database 172, a mobile application impression database 174, and a vehicle application impression database 176.

Impressions corresponding to the vehicle infotainment system 108 and/or the mobile device 110 could be collected using any suitable media impression techniques including those techniques disclosed in Blumenau, U.S. Pat. No. 6,108,637, which is hereby incorporated herein by reference in its entirety, in international patent application no. PCT/US11/52623, filed on Sep. 21, 2011, which is hereby incorporated herein by reference in its entirety, Burbank et al., U.S. Pat. No. 8,930,701, which is hereby incorporated herein by reference in its entirety, and Mazumdar et al., U.S. Pat. No. 8,370,489, which is hereby incorporated herein by reference in its entirety.

Figure 2:
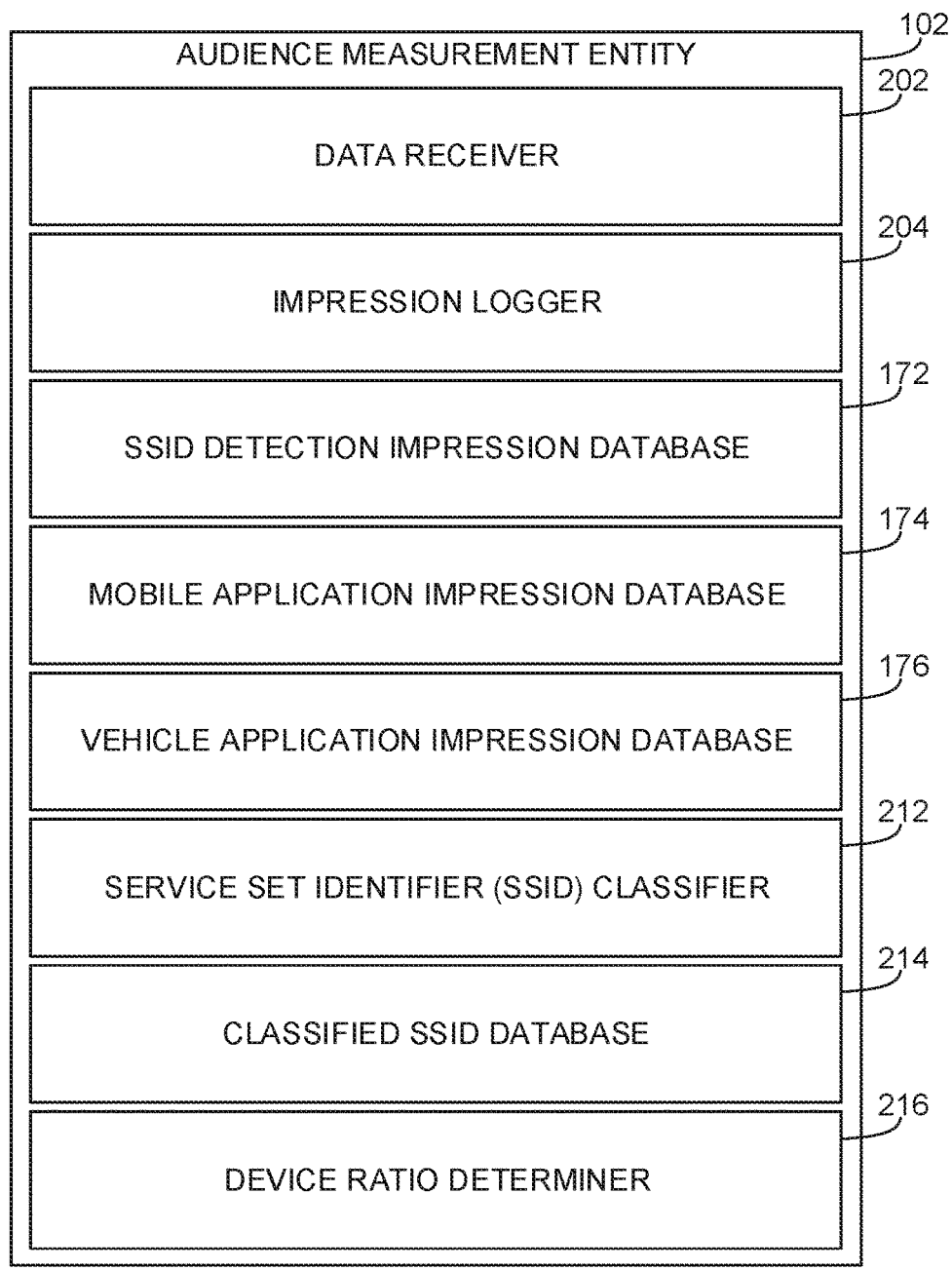
FIG. 2 is a block diagram of an example system to receive and process mobile device and vehicle application usage.

FIG. 2 is a block diagram of the example audience measurement entity 102 to receive and process impressions or impression batches from the example vehicle 106 and the example mobile device 110. In some examples, the audience measurement entity 102 can be implemented with various database proprietors or at a single example database proprietor.

In the illustrated example, the example audience measurement entity 102 receives data via a data receiver 202. The example data receiver 202 interacts with the vehicle infotainment system 108 and the mobile device 110. In the illustrated example, the data receiver 202 receives information via the wireless network 104, however in other examples, the information could be sent via wired communication or various other similar data communication methods.

The example data receiver 202 interacts with an impression logger 204. The example impression logger 204 logs mobile device impressions and in-vehicle infotainment impressions sent by their respective impression detectors 124 and 138 of FIG. 1. The example impression logger 204 can log both application impression logs and SSID impression logs received from the impression detector 124 or 138. Additionally, the example impression logger 204 is capable of logging individual impressions or a plurality of impressions received at the data receiver 202.

In the illustrated example, the impression logger 204, after processing an impression from the example data receiver 202, sends the impression to the appropriate database. The impression logger 204 classifies the impression and can send the impression to the SSID detection impression database 172, a mobile application impression database 174, or a vehicle application impression database 176. Additionally or alternatively the audience measurement entity may have additional databases or fewer databases to record the processed impressions.

The example SSID detection impression database 172 stores information including a mobile device identifier, the SSID detected, the start date and time of detection, and the duration of detection. Additionally or alternatively, the SSID detection impression database 172 can include the end date and time of detection.

An example service set identifier (SSID) classifier 212 accesses the example SSID detection impression database 172 and determines if a selected SSID detected by the example mobile device 110 of FIG. 1 is a vehicle SSID. For example, the SSID classifier 212 may classify the selected SSID as the vehicle SSID if the selected SSID is detected at least three times a week and 8 other SSIDs are detected during the same period of time as the selected SSID. In other examples, the number of times the selected SSID must be detected in a week or the number of SSIDs detected together with the selected SSID may be greater or fewer.

Both the example mobile application impression database 174 and the example vehicle application impression database 176 of FIG. 1 store application impressions sent from the mobile device 110 and the vehicle infotainment system 108 respectively. Information collected with respect to these impressions include, for example, the identifier of the example vehicle 106 or mobile device 110, identification of the application, start time and date of the application use, and duration of use of the application. Additionally or alternatively, the information includes the end time and date of the application use, an application user ID, and/or information concerning the content presented via the application.

In the illustrated example, SSIDs classified as a vehicle SSID will be sent to a classified SSID database 214. In some examples, the classified SSID database 214 is included in the database 170 of FIG. 1. Additionally or alternatively, classified SSIDs can be provided by vehicle manufacturers, vehicle owners, or gathered in another fashion.

An example device ratio determiner 216 accesses the SSID detection impression database 172, the mobile application impression database 174, the vehicle application impression database 176, and the classified SSID database 214 to determine a ratio of mobile application 132 usage to infotainment application 118 usage while the example mobile device 110 is located within an example vehicle 106. For example, the device ratio determiner 216 can identify a period of time when the example mobile device 110 is located within the example vehicle 106, as shown in FIG. 1, based on detection of properly classified SSIDs from the classified SSID database 214. The example device ratio determiner 216 then compares the mobile application 132 usage from the mobile impression database and the infotainment application 118 usage from the vehicle impression database and determines the ratio the usages.

In various examples, the device ratio determiner 216 can show the ratio of mobile device application usage to vehicle infotainment application usage overall by comparing application usage of the same application available on the example mobile device 110 and the example vehicle infotainment system 108. Additionally or alternatively, the example device ratio determiner 216 can evaluate all panelists, a subset of panelist according to various demographic categories, and/or individual panelist.

FIG. 3 is the example SSID detection impression database 172 of FIG. 1. In the illustrated example, the SSID detection impression database 172 includes a mobile device identifier column 302, a date and time column 304, an SSID detected column 306, and an SSID detection duration column 308. In one example, the SSID classifier 212 of FIG. 2 accesses the SSID detection impression database 172 and, for example, evaluates the SSID detected in the first row 320. The SSID classifier 212 identifies that at least two other SSIDs 322 were detected while the SSID in the first row 320 was detected. In another example, the SSID classifier 212 evaluates the SSID detected in the eleventh row 324 and determines that no other SSIDs are detected while the SSID in the eleventh row 324 is detected.

In some examples, the SSID detection impression database 172 can include additional or fewer fields. The example SSID detection impression database 172 can include a user identifier and end time and date of SSID detection.

FIG. 4 is the example mobile application impression database 174 of FIG. 1. In the illustrated example, the mobile application impression database 174 includes a mobile device identifier column 402, an application column 404, an application start time column 406, and an application duration column 408.

In some examples, the mobile application impression database 174 can include additional or fewer fields. The example mobile application impression database 174 can include the end time and date of the application use, an application user ID, and/or information concerning the content presented via the application.

FIG. 5 is the example vehicle application impression database 176 of FIG. 1. In the illustrated example, the vehicle application impression database 176 includes a vehicle SSID identifier column 502, an application column 504, an application start time column 506, and an application duration column 508.

In some examples, the vehicle application impression database 176 can include additional or fewer fields. The example vehicle application impression database 176 can include the end time and date of the application use, an application user ID, and/or information concerning the content presented via the application.

In one example, the device ratio determiner 216 of FIG. 2 accesses the SSID detection impression database 172, the mobile application impression database 174, and the vehicle application impression database 176 and evaluates mobile device application usage when an example mobile device 110 is in an example vehicle 106. The example device ratio determiner 216 determines a period of time indicating the mobile device 110 is located within the vehicle 106, such as, the SSID detection log first row 320 time period. Further, the device ratio determiner 216 determines mobile device 110 and vehicle infotainment system 108 application usage during the same or similar time periods by identifying impressions, such as, a row 420 of the mobile application impression database 174 and vehicle infotainment application usage log rows 520. In this present example, user 112 of FIG. 1 accessed a music app on the mobile device 110 as indicated by row 420 but switched to a music application on the vehicle infotainment system 108 upon entering the example vehicle 106 as suggested by row 522.

While an example manner of implementing the audience measurement entity 102 of FIG. 1 is illustrated in FIG. 2, one or more of the elements, processes and/or devices illustrated in FIG. 2 may be combined, divided, re-arranged, omitted, eliminated and/or implemented in any other way. Further, the example data receiver 202, the example impression logger 204, the example SSID detection impression database 172, the example mobile application impression database 174, the example vehicle application impression database 176, the example SSID classifier 212, the example classified SSID database 214, the device ratio determiner 216, and/or, more generally, the example audience measurement entity 102 of FIG. 1 may be implemented by hardware, software, firmware and/or any combination of hardware, software and/or firmware. Thus, for example, any of the example the example data receiver 202, the example impression logger 204, the example SSID detection impression database 172, the example mobile application impression database 174, the example vehicle application impression database 176, the example SSID classifier 212, the example classified SSID database 214, the device ratio determiner 216, and/or, more generally, the example audience measurement entity 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example data receiver 202, the example impression logger 204, the example SSID detection impression database 172, the example mobile application impression database 174, the example vehicle application impression database 176, the example SSID classifier 212, the example classified SSID database 214, the device ratio determiner 216 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example audience measurement entity 102 of FIG. 1 may include one or more elements, processes and/or devices in addition to, or instead of, those illustrated in FIG. 2, and/or may include more than one of any or all of the illustrated elements, processes and devices.

Figure 6:
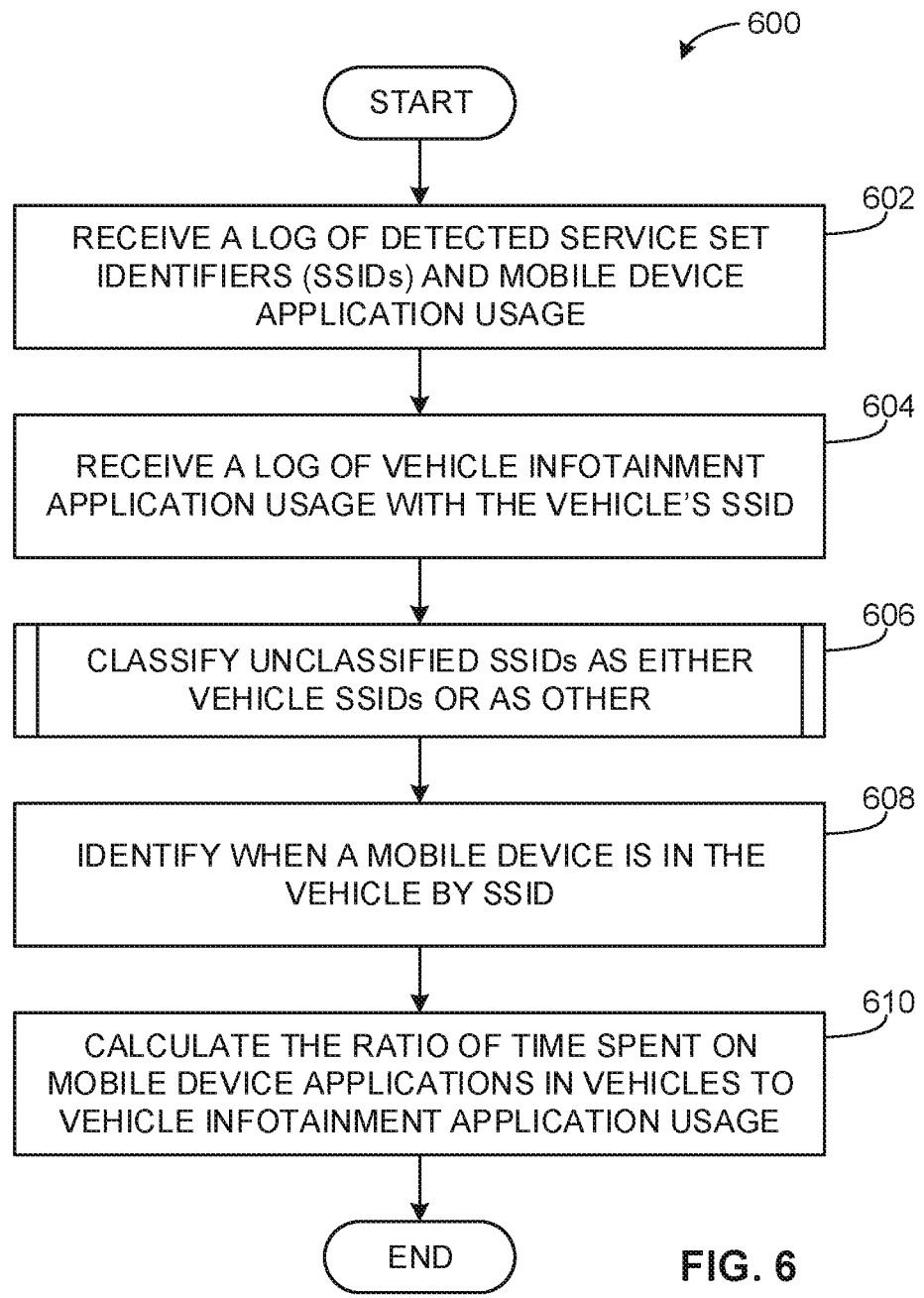
FIG. 6 is a flowchart representative of machine readable instructions that may be executed to implement the mobile device application ratio determination process.
Figure 7:
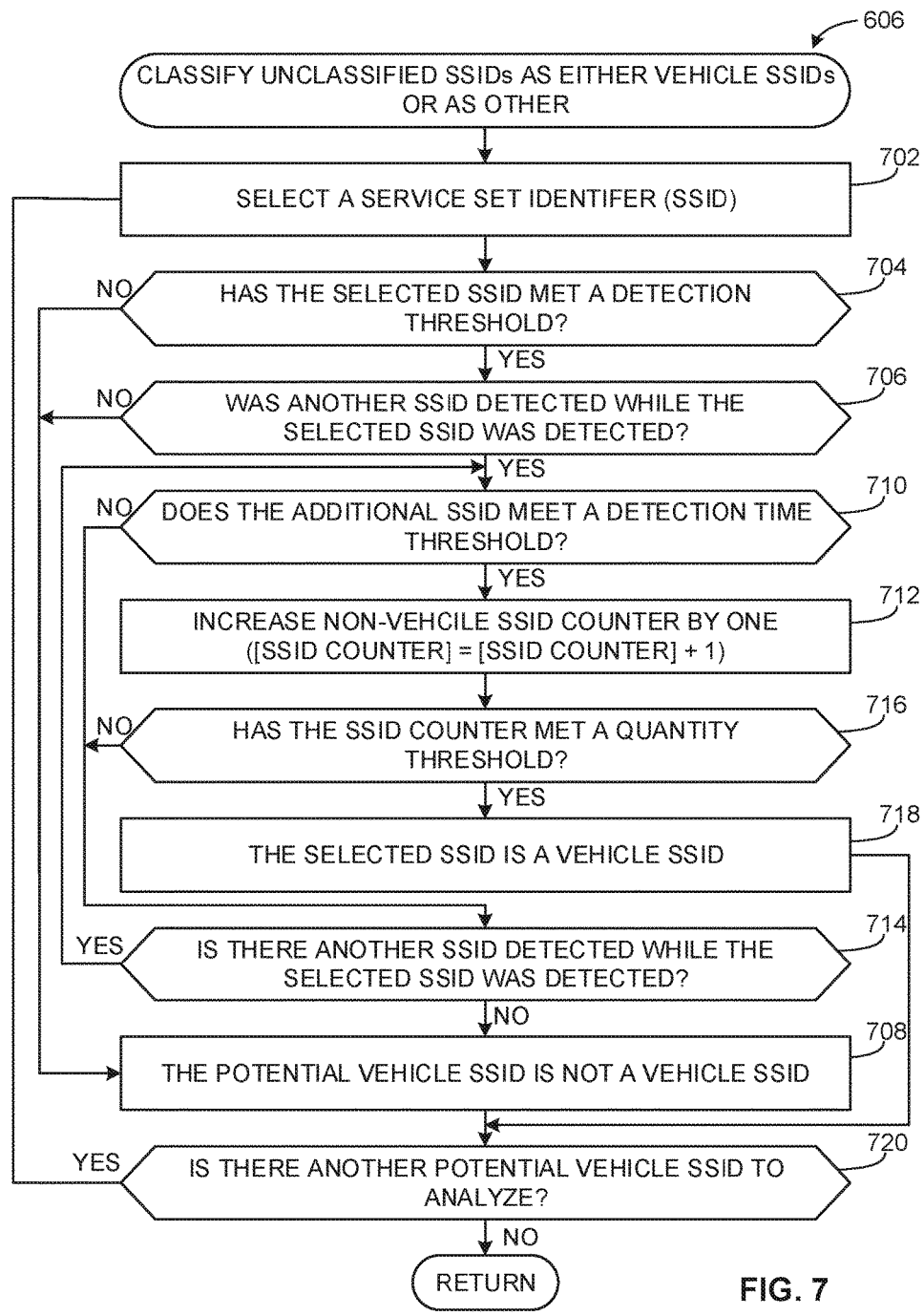
FIG. 7 is a flowchart representative of machine readable instructions that may be executed to implement the classification of car SSIDs detected by wireless monitoring devices.

A flowchart representative of example machine readable instructions for implementing the audience measurement entity of FIG. 1 is shown in FIGS. 6-7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6-7, many other methods of implementing the example audience measurement entity 102 may alternatively be used. For example, the order of execution of the blocks may be changed, and/or some of the blocks described may be changed, eliminated, or combined.

As mentioned above, the example processes of FIGS. 6-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart representative of an example method 600 to calculate a ratio of time spent on mobile applications 132 to infotainment applications 118 when a mobile device 110 is located within an example vehicle 106. The example method 600 can be performed at least in part by machine readable instructions executed at the example audience measurement entity 102 of FIG. 1. Additionally or alternatively, the example method could be done at least in part by the mobile device 110 and/or the vehicle infotainment system 108.

The data receiver 202 receives from the impression detector 138 on the example mobile device 110 an impression or a batch of impressions of detected SSIDs and/or application usages (block 602). For example, an SSID impression can be sent by the impression detector 138 on the mobile device 110 after the mobile device 110 detects SSID 152 of the example vehicle 150. The example impression logger 204 then allocates the impressions to their corresponding databases: SSID detection impression database 172 or mobile application impression database 174.

The data receiver 202 receives from the impression detector 124 on the example vehicle infotainment system 108 an impression or a batch of impressions of vehicle infotainment application usages. For example, an application impression can be sent by the example impression detector 124 after the example user 112 activates infotainment application 118. The example impression logger 204 then sends the impressions to the vehicle application impression database 176.

After the example impression logger 204 has allocated impressions to their respective databases, at subprocess 606, the SSID classifier 212 accesses the SSID detection impression database 172 and classifies each detected SSID as either a vehicle SSID or as not a vehicle SSID. Subprocess 606 is described in further detail in FIG. 7.

The example device ratio determiner 216 identifies time periods for which the example mobile device 110 is located within the example vehicle 106 by accessing the SSID detection impression database 172 and classified SSID database 214 and identifying time periods in the SSID detection impression database 172 that correlate to an SSID classified as a vehicle SSID (block 608). After identifying when the example mobile device 110 is located within the example vehicle 106, the method 600 continues to block 610.

The example device ratio determiner 216 determines a ratio of mobile application 132 usage to infotainment application 118 usage (block 610). Additionally or alternatively, the device ratio determiner 216 can determine application usage ratios of individuals or selected demographics; a user usage pattern of mobile device application usage; and/or usage amounts between one application available on both the example vehicle infotainment system 108 and the example mobile device 110.

FIG. 7 is a flowchart representative of the example subprocess 606 to classify detected SSIDs as vehicle SSIDS or as not vehicle SSIDs. The example subprocess 606 can be performed at least in part by computer readable instructions executed at the example audience measurement entity 102 of FIG. 1. Additionally or alternatively, the example method could be done at least in part by the mobile device 110 and/or the vehicle infotainment system 108. Subprocess 606 starts at block 702.

The SSID classifier 212 selects an SSID to evaluate and the subprocess 606 continues to block 704 (block 702). For example the SSID classifier selects an SSID from the SSID detection impression database 172 that has not been yet classified. In various examples, the SSID classifier 212 may reclassify SSIDs formerly classified as not a vehicle SSID. After the example SSID classifier 212 has selected an SSID to evaluate, the subprocess 606 continues to block 704

The SSID classifier 212 determines if the SSID has met an SSID detection threshold (e.g., the SSID has been detected at least three times in one week) (block 704). If the SSID detection threshold has been met, the subprocess 606 proceeds to block 706, otherwise if the detection threshold has not been met, the subprocess 606 proceeds to block 708 and the SSID is classified as not a vehicle SSID. In other various examples, the detection threshold may be greater or fewer than 3 detections in a week.

The SSID classifier 212 determines if additional SSIDs were detected while the selected SSID was detected (block 706). If additional SSIDs were detected, the subprocess 606 proceeds to block 710, otherwise the subprocess 606 proceeds to block 708 and the SSID is classified as not a vehicle SSID.

The SSID classifier determines if, while the selected SSID was detected, one additional SSID meets a predetermined detection time threshold (e.g., the additional SSID was detected for less than twenty minutes) (block 710). In various examples, the predetermined time threshold may be greater or less than twenty minutes. If the additional SSID meets the predetermined detection time threshold, the subprocess 606 proceeds to block 712 to increase an SSID counter, otherwise the subprocess 606 proceeds to block 714 to check for more additional SSIDs to evaluate. In the illustrated example, the example subprocess 606 proceeds to block 716 after the SSID counter has properly incremented.

The SSID classifier 212 checks if there are additional SSIDs to evaluate (block 714). If there are no more additional SSIDs detected while the selected SSID was detected, the subprocess 606 proceeds to block 708, otherwise the subprocess 606 proceeds to block 710 and the SSID classifier 212 evaluates the additional SSID.

The SSID classifier 212 determines if the SSID counter has met a predetermined quantity threshold (e.g., the quantity of detected SSIDs is at least 8 SSIDs that meet the predetermined detection time threshold) (block 716). In other examples the quantity threshold may be greater or less than eight SSIDs. If the quantity threshold has been met, the subprocess 606 proceeds to block 718 and the SSID classifier classifies the selected SSID as a vehicle SSID, otherwise the subprocess 606 proceeds to block 714 to check for additional SSIDs to evaluate.

After the classifier classified the selected SSID as not a vehicle SSID (block 708), or the classifier classified the selected SSID as a vehicle SSID (block 718), the subprocess 606 proceeds to block 720. The SSID classifier 212 checks if there are more SSIDs to be analyzed (block 720). If more SSIDs are to be analyzed, the subprocess 606 returns to block 702, otherwise the subprocess 606 returns to block 608 of FIG. 6.

Figure 8:
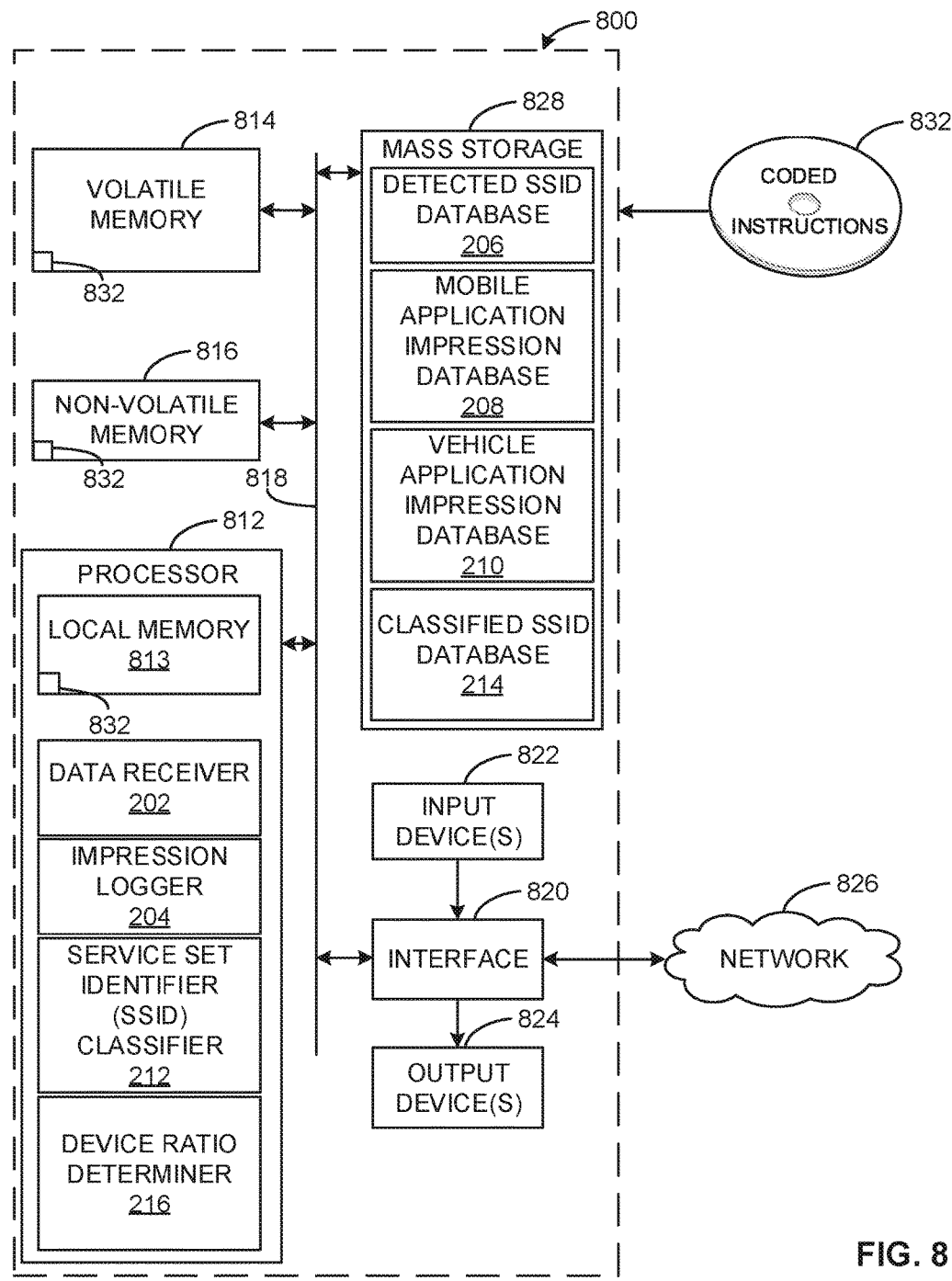
FIG. 8 is a processor platform diagram to implement the block diagram of FIG. 2 and to execute the instructions of FIG. 6 and FIG. 7.

FIG. 8 is a block diagram of an example processor platform 800 capable of executing the instructions of FIGS. 6-7 to implement the audience measurement entity 102 of FIG. 1. The processor platform 800 can be, for example, a server, a personal computer, a mobile device (e.g., a cell phone, a smart phone, a tablet such as an iPad™), a personal digital assistant (PDA), or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller. In this example, the processor 812 may additionally include the example data receiver 202, the example impression logger 204, the example SSID classifier 212, and the example device ratio determiner 216.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. In the illustrated example, the mass storage 828, may additionally include the example SSID detection impression database 172, the example mobile application impression database 174, the example vehicle application impression database 176, and the example classified SSID database 214.

The coded instructions 832 of FIGS. 6-7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods and apparatus may be used to calculate a ratio of mobile device application usage to vehicle infotainment application usage during periods of time a mobile device is located within a vehicle. By calculating this ratio or determining a user usage pattern of mobile device application usage, application developers will better understand the tendencies of consumers to use mobile device applications over vehicle infotainment applications and invest their money and time into the appropriate applications.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for monitoring a usage of a mobile device application, the usage of the mobile device application occurring while a mobile device is in a vehicle, the apparatus comprising:
a data receiver to receive, via network communications, first and second messages from the mobile device;
an impression logger to:
store a first record of a first mobile device impression in a memory based on the first message, the first mobile device impression corresponding to an instance of usage of the mobile device application via the mobile device to access first media;
store a second record of a second mobile device impression in the memory based on the second message, the second mobile device impression associated with a Service Set Identifier (SSID) detected by the mobile device; and
store a third record of an in-vehicle media device impression in the memory based on a third message received from the vehicle, the in-vehicle media device impression corresponding to an instance of usage of an in-vehicle media device application via an in-vehicle media device to access second media; and
a device ratio determiner to:
determine, by executing an instruction with a processor, that the first mobile device impression occurred while the mobile device was located in the vehicle based on the SSID detected by the mobile device during the instance of usage of the mobile device application; and
determine, by executing an instruction with the processor, a ratio of mobile device application usage to in-vehicle media device application usage based on the in-vehicle media device impression and based on determining that the first mobile device impression occurred while the mobile device was located in the vehicle.

2. The apparatus of claim 1, wherein at least one of the first message or the second message further includes identification information of a mobile device user.

3. The apparatus of claim 1, wherein the third message further includes the SSID associated with the vehicle.

4. The apparatus of claim 1, wherein the first message and the second message are received together in a single message.

5. An apparatus for monitoring a usage of a mobile device application, the usage of the mobile device application occurring while a mobile device is in a vehicle, the apparatus comprising:
 a data receiver to receive, via network communications, first and second messages from the mobile device;
 an impression logger to:
  store a first record of a first mobile device impression in a memory based on the first message, the first mobile device impression corresponding to an instance of usage of the mobile device application via the mobile device to access first media;
  store a second record of a second mobile device impression in the memory based on the second message, the second mobile device impression associated with a Service Set Identifier (SSID) detected by the mobile device; and
  store a third record of an in-vehicle media device impression in the memory based on a third message received from the vehicle, the in-vehicle media device impression corresponding to an instance of usage of an in-vehicle media device application via an in-vehicle media device to access second media; and
 a device ratio determiner to:
  determine, by executing an instruction with a processor, that the first mobile device impression occurred while the mobile device was located in the vehicle based on the SSID detected by the mobile device during the instance of usage of the mobile device application; and
  determine a user usage pattern of mobile device application usage to in-vehicle media device application usage based on the in-vehicle media device impression and based on determining that the first mobile device impression occurred while the mobile device was located in the vehicle.

6. A method for monitoring a usage of a mobile device application the usage of the mobile device application occurring while a mobile device is in a vehicle, the method comprising:
 receiving, via a first network communication a first message from the mobile device;
 storing a first record of a first mobile device impression in a memory based on the first message, the first mobile device impression corresponding to an instance of usage of the mobile device application via the mobile device to access first media;
 receiving, via a second network communication a second message from the mobile device;
 storing a second record of a second mobile device impression in the memory based on the second message, the second mobile device impression associated with a Service Set Identifier (SSID) logged by the mobile device;
 storing a third record of an in-vehicle media device impression in the memory based on a third message received from the vehicle, the in-vehicle media device impression corresponding to an instance of usage of an in-vehicle media device application via an in-vehicle media device to access second media;
 determining, by executing an instruction with a processor, that the first mobile device impression occurred while the mobile device was located in the vehicle based on the SSID logged by the mobile device during the instance of usage of the mobile device application; and
 determining, by executing an instruction with the processor, a ratio of mobile device application usage to in-vehicle media device application usage based on the in-vehicle media device impression and based on determining that the first mobile device impression occurred while the mobile device was located in the vehicle.

7. A method for monitoring a usage of a mobile device application, the usage of the mobile device application occurring while a mobile device is in a vehicle, the method comprising:
 receiving, via a first network communication, a first message from the mobile device;
 storing a first record of a first mobile device impression in a memory based on the first message, the first mobile device impression corresponding to an instance of usage of the mobile device application via the mobile device to access first media;
 receiving, via a second network communication, a second message from the mobile device;
 storing a second record of a second mobile device impression in the memory based on the second message, the second mobile device impression associated with a Service Set Identifier (SSID) logged by the mobile device;
 storing a third record of an in-vehicle media device impression in the memory based on a third message received from the vehicle, the in-vehicle media device impression corresponding to an instance of usage of an in-vehicle media device application via an in-vehicle media device to access second media;
 determining, by executing an instruction with a processor, that the first mobile device impression occurred while the mobile device was located in the vehicle based on the SSID logged by the mobile device during the instance of usage of the mobile device application; and
 determining a user usage pattern of mobile device application usage to in-vehicle media device application usage based on the in-vehicle media device impression and based on determining that the first mobile device impression occurred while the mobile device was located in the vehicle.

8. The method of claim 7, wherein at least one of the first message or the second message further includes identification information of a mobile device user.

9. The method of claim 7, wherein the third message further includes the SSID associated with the vehicle.

10. A tangible computer readable storage medium comprising computer readable instructions which, when executed, cause a processor to at least:
 receive, via a first network communication, a first message from a mobile device;
 store a first record of a first mobile device impression in a memory based on the first message, the first mobile device impression corresponding to an instance of usage of a mobile device application via the mobile device to access first media;
 receive, via a second network communication, a second message from the mobile device;
 store a second record of a second mobile device impression in the memory based on the second message, the second mobile device impression corresponding to a Service Set Identifier (SSID) detected by the mobile determine that the mobile device impression occurred while the mobile device was located in a vehicle based on a service set identifier (SSID) detected by the mobile device during the instance of usage of the mobile device application; and determine a ratio of mobile device application usage to in-vehicle media device application usage based on the in-vehicle media device impression and based on determining that the first mobile device impression occurred while the mobile device was located in the vehicle.

11. The computer readable storage medium of claim 10, wherein the third message further includes the SSID of the vehicle.

12. The computer readable storage medium of claim 10, wherein the first message further includes identification information of a mobile device user.

13. The computer readable storage medium of claim 10, wherein the first message and the second message are received together in a single message.

14. A tangible computer readable storage medium comprising computer readable instructions which, when executed, cause a processor to at least:

receive, via a first network communication, a first message from a mobile device;

store a first record of a first mobile device impression in a memory based on the first message, the first mobile device impression corresponding to an instance of usage of a mobile device application via the mobile device to access first media;

receive, via a second network communication, a second message from the mobile device;

store a second record of a second mobile device impression in the memory based on the second message, the second mobile device impression corresponding to a Service Set Identifier (SSID) detected by the mobile device;

determine that the mobile device impression occurred while the mobile device was located in a vehicle based on a service set identifier (SSID) detected by the mobile device during the instance of usage of the mobile device application; and determine a user usage pattern of mobile device application usage to in-vehicle media device application usage based on the in-vehicle media device impression and based on determining that the first mobile device impression occurred while the mobile device was located in the vehicle.

\* \* \* \* \*

UNITED STATES PATENT AND TRADEMARK OFFICE
CERTIFICATE OF CORRECTION

PATENT NO. : 10,104,564 B1  
APPLICATION NO. : 15/487198  
DATED : October 16, 2018  
INVENTOR(S) : Susan Cimino et al.

Page 1 of 1

It is certified that error appears in the above-identified patent and that said Letters Patent is hereby corrected as shown below:

In the Claims

Column 14, Line 62 Claim 10:  
After "mobile" insert --device;--

Column 14, Line 63 Claim 10:  
Start new paragraph at "determine"

Signed and Sealed this  
Twelfth Day of February, 2019

Andrei Iancu  
*Director of the United States Patent and Trademark Office*